Dec. 17, 1935.  C. E. GASKIN  2,024,281
LIGHT
Filed March 12, 1935  2 Sheets-Sheet 1

Inventor
Charles E. Gaskin,

By *Clarence A. O'Brien*
Attorney

Dec. 17, 1935.   C. E. GASKIN   2,024,281
LIGHT
Filed March 12, 1935   2 Sheets-Sheet 2
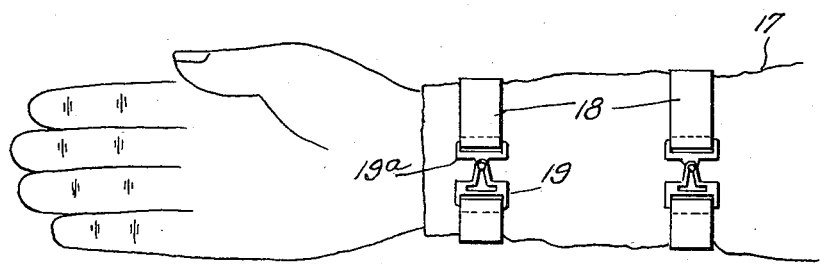
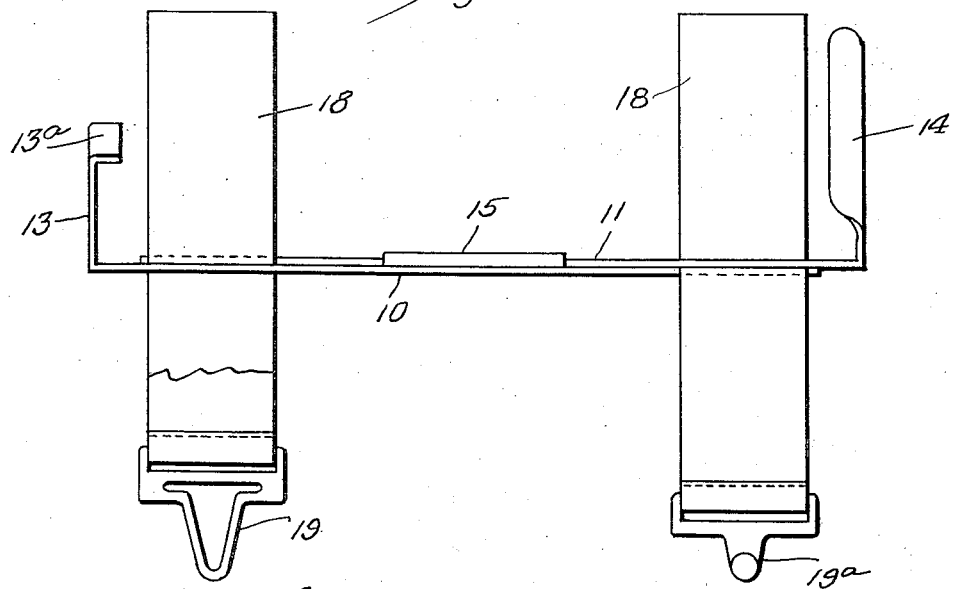
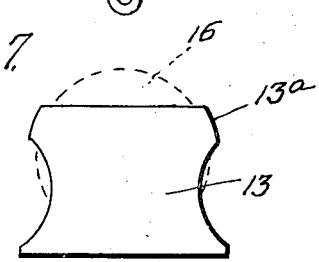
Inventor
Charles E. Gaskin,
By Clarence A. O'Brien
Attorney Patented Dec. 17, 1935

2,024,281

UNITED STATES PATENT OFFICE 2,024,281

LIGHT

Charles E. Gaskin, Aberdeen, Miss.

Application March 12, 1935, Serial No. 10,716

1 Claim. (Cl. 240—59)

This invention relates broadly to the class of illumination and has as its object the provision of a handy light, characterized by simplicity of construction, and adaptation, and which can be readily fastened to the arm in a manner for use when exploring dark corners, or for meter reading, and for numerous other purposes as will readily present themselves.

A further object of the invention is also to provide a light of this character which will prove a useful accessory for automobile drivers, night watchmen, and which also can be used for many purposes in the home.

Briefly the invention consists of a flashlight together with a holder therefor for securing the holder on the arm in a manner to permit of ready convenient use of the flashlight.

The invention together with its objects and advantages will be best understood from a study of the following description taken in connection with the accompanying drawings wherein:

Figure 5 is a view reverse to that shown in Figure 1 and further illustrating the invention.

Figure 6 is a side elevational view of the light holder and attaching straps.

Figure 7 is an end elevational view of a part of the holder.

Figure 4:
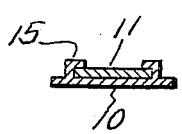
Figure 4 is a fragmentary detail sectional view showing the guide flanges on one part of the holder in which a part of the second part of the holder operates.

Referring to the drawings by reference numerals, it will be seen that the device comprises a holder consisting of a pair of companion sections or parts 10 and 11 respectively. Each of the parts 10 and 11 includes a relatively wide end portion provided with strap accommodating slots 12 and an end retaining flange, the flange of the part 10 being indicated by the reference numeral 13 and the flange of the part 11 being indicated by the reference numeral 14. The parts or sections 10 and 11 of the holder also include narrow elongated ends arranged in overlapping relation with the said narrow elongated end of the holder section 10 provided with a short spaced parallel guide channel 15 between which operate the narrow end part of the holder section 11 as clearly shown in Figure 4. Thus the sections 10 and 11 may be adjusted longitudinally to accommodate a somewhat conventional flashlight 16 of any suitable length.

Figure 1:
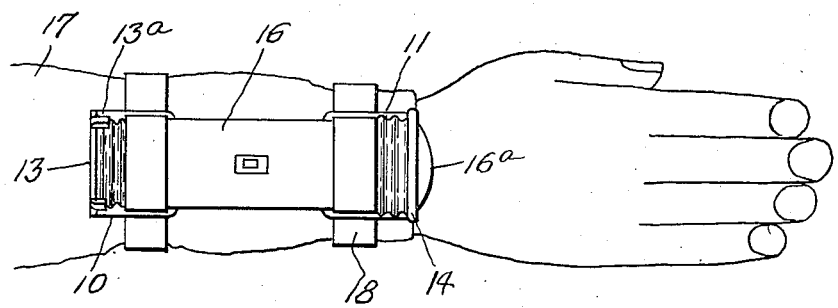
Figure 1 is an elevational view illustrating the application of the invention.
Figure 2:
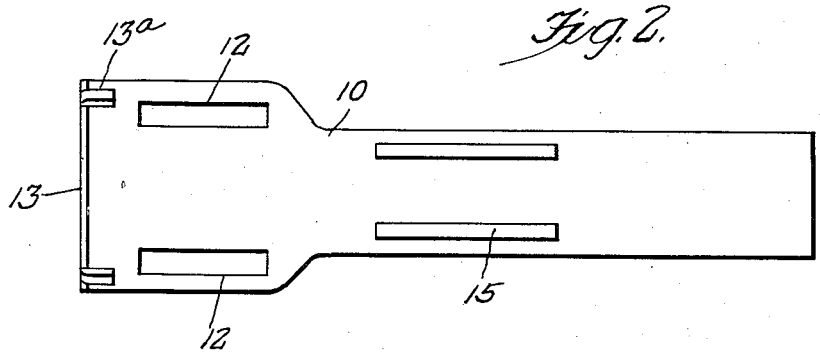
Figure 2 is a plan view of one part of the holder.
Figure 3:
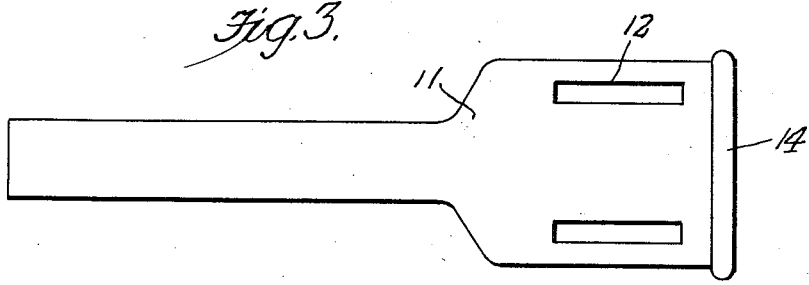
Figure 3 is a similar view of the companion or second part of the holder.

As shown in the drawings, the flashlight 16 is disposed on the holder longitudinally thereof with the butt end of the flashlight casing engaging the flange 13 that engages by spring fingers 13a formed on the edge of the flange 13 and as will be clear from a study of Figures 1, 2, and 7. The flange 14 is apertured to accommodate the lens 16a of the flashlight 16 as shown in Figure 1.

To secure the flashlight 16 on the holder, and the holder and flashlight on the arm 17 of the wearer, straps 18 are provided. The straps 18 consist of elastic webs, or other suitable material provided with complemental fastening devices 19, 19a on the ends therof. The straps 18 are trained over the flashlight 16 and through the slots 12 and then around the arm 17 as will be clear from a study of Figures 1 and 5 with the fastener equipped ends of the straps then engaged as shown in Figure 5 to thereby securely retain the device on the arm.

Obviously with the device thus attached to the arm the hands of the user are free for use while at the same time the light will be held so that the full benefits thereof may be obtained.

It will be apparent that a device of this character will have many uses and when not in use can be conveniently carried in one's pocket.

Having thus described the invention, what is claimed as new is:

In a lighting device of the character described, a longitudinally extensible holder for flashlights, one end of said holder having an upstanding retaining flange adapted to abut one end of the flashlight, an upstanding apertured flange on the other end of said holder adapted to receive the lens end of the flashlight, a portion of said lens projecting through said aperture, said holder at opposite ends thereof being provided with slots, and straps passing around said flashlight and through said slot and adapted to be fastened around the arm of the user for securing the holder and flashlight in position on the arm.

CHARLES E. GASKIN.